(12) United States Patent
Yau (10) Patent No.: US 12,099,405 B2
(45) Date of Patent: *Sep. 24, 2024

(54) SYSTEMS AND METHODS FOR REDUCED LATENCY IN DATA PROCESSING

(71) Applicant: Johnny Yau, Jersey City, NJ (US)

(72) Inventor: Johnny Yau, Jersey City, NJ (US)

(73) Assignee: Johnny Yau, Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,951

(22) Filed: Apr. 3, 2023

(65) Prior Publication Data

US 2024/0070016 A1 Feb. 29, 2024

Related U.S. Application Data

(63) Continuation of application No. 17/392,403, filed on Aug. 3, 2021, now Pat. No. 11,620,183, which is a continuation of application No. 16/552,138, filed on Aug. 27, 2019, now Pat. No. 11,080,133.

(60) Provisional application No. 62/723,181, filed on Aug. 27, 2018.

(51) Int. Cl.
*G06F 11/10* (2006.01)
*G06F 3/06* (2006.01)
*G06F 11/14* (2006.01)

(52) U.S. Cl.
CPC ........ *G06F 11/1004* (2013.01); *G06F 3/0613* (2013.01); *G06F 3/0653* (2013.01); *G06F 3/0673* (2013.01); *G06F 11/1407* (2013.01); *G06F 11/1471* (2013.01)

(58) Field of Classification Search
None
See application file for complete search history.

(56) References Cited

U.S. PATENT DOCUMENTS

| | | | |
|---|---|---|---|
| 7,051,259 B1 | 5/2006 | Williams, Jr. et al. | |
| 8,365,015 B1 | 1/2013 | Yu et al. | |
| 11,080,133 B1 | 8/2021 | Yau | |
| 11,620,183 B1 * | 4/2023 | Yau | G06F 11/1004 |
| | | | 714/799 |
| 2011/0047334 A1 | 2/2011 | Eichenberger et al. | |
| 2019/0386935 A1 | 12/2019 | Back et al. | |

* cited by examiner

*Primary Examiner* — Guerrier Merant
(74) *Attorney, Agent, or Firm* — Troutman Pepper Hamilton Sanders LLP; Christopher C. Close, Jr.

(57) ABSTRACT

A method for reducing observed processing latency in networked communication, the method comprising: receiving a first portion of data, the data consisting of the first portion and a second portion; initializing data processing on the data after receiving the first portion of data and before receiving the second portion of the data; receiving the second portion of the data, the second portion of the data including error-detection code; performing error detection on the data based on the error-detection code; in response to the error detection indicating that the data is valid, finalizing data processing on the data and committing a data-processing result; and in response to the error detection indicating that the data is invalid, performing an error-correction process.

18 Claims, 7 Drawing Sheets

SYSTEMS AND METHODS FOR REDUCED LATENCY IN DATA PROCESSING

CROSS-REFERENCE TO RELATED APPLICATIONS

This application is a continuation of U.S. application Ser. No. 17/392,403 filed Aug. 3, 2021, which is a continuation of U.S. application Ser. No. 16/552,138 filed Aug. 27, 2019, which claims the benefit of U.S. Provisional Patent Application No. 62/723,181, filed Aug. 27, 2018, the disclosures of which are incorporated by reference in their entireties as if fully set forth below.

BACKGROUND

Modern computer systems utilize layered communication protocols which include one or more error-detection codes (e.g., checksum or CRC32) as safeguards to prevent consumption of corrupt data. But error-detection code cannot be validated until the entire data payload (i.e., the entire data payload corresponding to the error-detection code) is fully ingested. For example, TCP-IP over an Ethernet network stack contains two error-detection codes that cannot be verified until a data packet is fully ingested. In the related art, higher level logic (e.g., application logic) waits for the code verification before beginning to process data. But the standard approach creates unnecessary delay in the further processing of the vast majority of data transfers which do not contain detectable errors.

The disclosed technology addresses the issues mentioned above and lowers the latency experienced in data transfer and processing within application logic.

SUMMARY

According to some embodiments, there is provided a method for reducing observed processing latency in networked communication, the method including: receiving a first portion of data, the data consisting of the first portion and a second portion; initializing data processing on the data after receiving the first portion of data and before receiving the second portion of the data; receiving the second portion of the data, the second portion of the data including error-detection code; performing error detection on the data based on the error-detection code; in response to the error detection indicating that the data is valid, finalizing data processing on the data and committing a data-processing result; and in response to the error detection indicating that the data is invalid, performing an error-correction process.

Performing the error-correction process may include at least one from among rolling back an application state to a prior state, abandoning processing, and re-initializing the application state to some pre-determined safe value.

The method may further include, before initializing the data processing, establishing an application checkpoint. Performing the error-correction process may include rolling back an application state to the application checkpoint.

Establishing the application checkpoint may be in response to receiving the first portion of the data.

The data processing and the committing the data-processing result may be performed at an application layer, and the error detection is performed at a layer lower than the application layer.

The method may be performed by at least one of a field-programmable gate array (FPGA) and an Application-Specific Integrated Circuit (ASIC).

The data processing may be performed in a first register of the FPGA or ASIC, and the data-processing result may be committed to a second register of the FPGA or ASIC.

According to some embodiments, there is provided a semiconductor device including: a first circuit block configured to receive a first portion of data and a second portion of the data, the second portion of the data including error-detection code; a second circuit block configured to initialize data processing on the data after the first circuit block receives the first portion of data and before first circuit block receives the second portion of the data; a third circuit block configured to perform error detection on the data based on the error-detection code; a fourth circuit block configured to, in response to error detection performed by the third circuit block indicating that the data is valid, finalize data processing on the data and commit a data-processing result; and a fifth circuit block configured to, in response to the error detection performed by the third circuit block indicating that the data is invalid, performing an error-correction process.

The fifth circuit block may be configured to perform the error-correction process comprising at least one from among rolling back an application state to a prior state, abandoning processing, and re-initializing the application state to some pre-determined safe value.

The second circuit block may be further configured to, before initializing the data processing, establish an application checkpoint, and the fifth circuit block may be configured to perform the error-correction process comprising rolling back an application state to the application checkpoint.

The second circuit block may be configured to establish the application checkpoint is in response to receiving the first portion of the data.

The semiconductor device may comprise at least one of a field-programmable gate array (FPGA) and an Application-Specific Integrated Circuit (ASIC).

The semiconductor device may further include a first register, wherein semiconductor device is configured to process the data within the first register.

The semiconductor device may further include a second register, wherein the fourth circuit block is configured to, in response to error detection performed by the third circuit block indicating that the data is valid, finalize data processing on the data and commit the data-processing result to the second register.

According to some embodiments, there is provided a system including: a processor; and a memory having instructions that, when executed by the processor, control the processor to implement a method for reducing observed processing latency in networked communication, the method comprising: receiving a first portion of data, the data consisting of the first portion and a second portion; initializing data processing on the data after receiving the first portion of data and before receiving the second portion of the data; receiving the second portion of the data, the second portion of the data including error-detection code; performing error detection on the data based on the error-detection code; in response to the error detection indicating that the data is valid, finalizing data processing on the data and committing a data-processing result; and in response to the error detection indicating that the data is invalid, performing an error-correction process.

Performing the error-correction process may include at least one from among rolling back an application state to a prior state, abandoning processing, and re-initializing the application state to some pre-determined safe value.

The method may further include, before initializing the data processing, establishing an application checkpoint. Performing the error-correction process may include rolling back an application state to the application checkpoint.

Establishing the application checkpoint may be in response to receiving the first portion of the data.

The data processing and the committing the data-processing result may be performed at an application layer, and the error detection is performed at a layer lower than the application layer.

The system may include at least one of a field-programmable gate array (FPGA) and an Application-Specific Integrated Circuit (ASIC).

BRIEF DESCRIPTION OF THE FIGURES

Implementations, features, and aspects of the disclosed technology are described in detail herein and are considered a part of the claimed disclosed technology. Other implementations, features, and aspects can be understood with reference to the following detailed description, accompanying drawings, and claims. Reference will now be made to the accompanying figures and flow diagrams, which are not necessarily drawn to scale.

DETAILED DESCRIPTION

Common schemes for processing data utilize stacked layers, which may each verify one or more error-correcting codes before providing the data to a higher layer in the stack. This process protects the higher layers (e.g., application logic) from processing and relying on corrupt data. However, in the vast majority of data transfers, the data is not corrupted, and this scheme introduces needless processing delay.

Although certain aspects of the present disclosure are described with reference toward a networking context, one of ordinary skill will recognize that certain inventive concepts may be applied in alternative data processing and communication contexts. For example, preemptive processing may be applied to various forms of packetized communications (e.g., processor interconnects and high-speed message buses like PCI-e), and may reduce processing latency therein.

The disclosed technology hides data validation overhead by preemptively processing data as it is received. As such, it reduces observed latency. In some implementations, as data is being received, data processing begins. Once an entire data set is received, error checking occurs. If the data is deemed valid, the data processing continues as necessary and commits the processing. If the data is deemed invalid, the processing may be abandoned, the application may roll-back to a prior state, the application may re-initialize to a pre-determined safe state, and/or the application may enter some other error-recovery process.

In some cases, the lower levels of a stack may pass the data to high levels as the data is ingested by the stack. For example, data may be fed from a network layer, to a transport layer, and processed in an application layer as the data is received by the system. Once the network and transport layers have access to all the data they may each perform error-detection algorithms (e.g., checksums, CRC32, and cryptographic secure checksums such as SHA-1, SHA-256, and MD5) to determine whether the data is valid. If an error is detected in either layer, the layer detecting the error may alert one or more higher layers of the detected error. For example, if the network-layer error detection detects an error, the network layer may alert the transport layer, which triggers the transport layer to alert the application layer. When the application layer receives the alert, it may cease processing the data and revert, as necessary, to a previous state.

In some cases, the lower layers may affirm the data validity. For example, if the network and transport layers fail to detect any errors, the transport layer may indicate to the application layer that the data is valid. The application logic may then commit the data processing result.

Certain embodiments may be implemented on, for example, a Field-Programmable Gate Array (FPGA) and/or Application-Specific Integrated Circuit (ASIC). The FPGA and/or ASIC may be modified to include two sets of application registers, one set for speculative processing done prior to the final notification of error-detection results, and another for committed states after an error free reception and processing of data. In some cases, the FPGA and/or ASIC may be configured to switch between designations of the "committed" register in response to the data being confirmed valid.

Certain implementations may utilize, for example, a Central-Processing Unit (CPU) and/or one or more memories. For instance, upon receiving data, the CPU may create a checkpoint. The CPU may process the data as it becomes available, and if the CPU deems the data invalid, the CPU would revert to the checkpoint. But if the CPU deems the data valid, the CPU commits the new state. Certain aspects of the disclosure may be implemented through software (e.g., stored in a non-transitory computer readable medium) and/or hardware (e.g., with transactional memory instructions, such as Intel™ TSX-NI™ instruction set). In some cases, the recovery process may be handled by issuing instructions (e.g., transactional memory instructions) to the memory system to set checkpoints, roll-back the state to the checkpoint, and commit new states. In some cases, an instruction to commit the current state may also imply an instruction to create a new checkpoint. In certain implementations, an instruction to set a new checkpoint may also imply an instruction to commit a current state.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology will now be described with reference to the accompanying figures.

Figure 1:
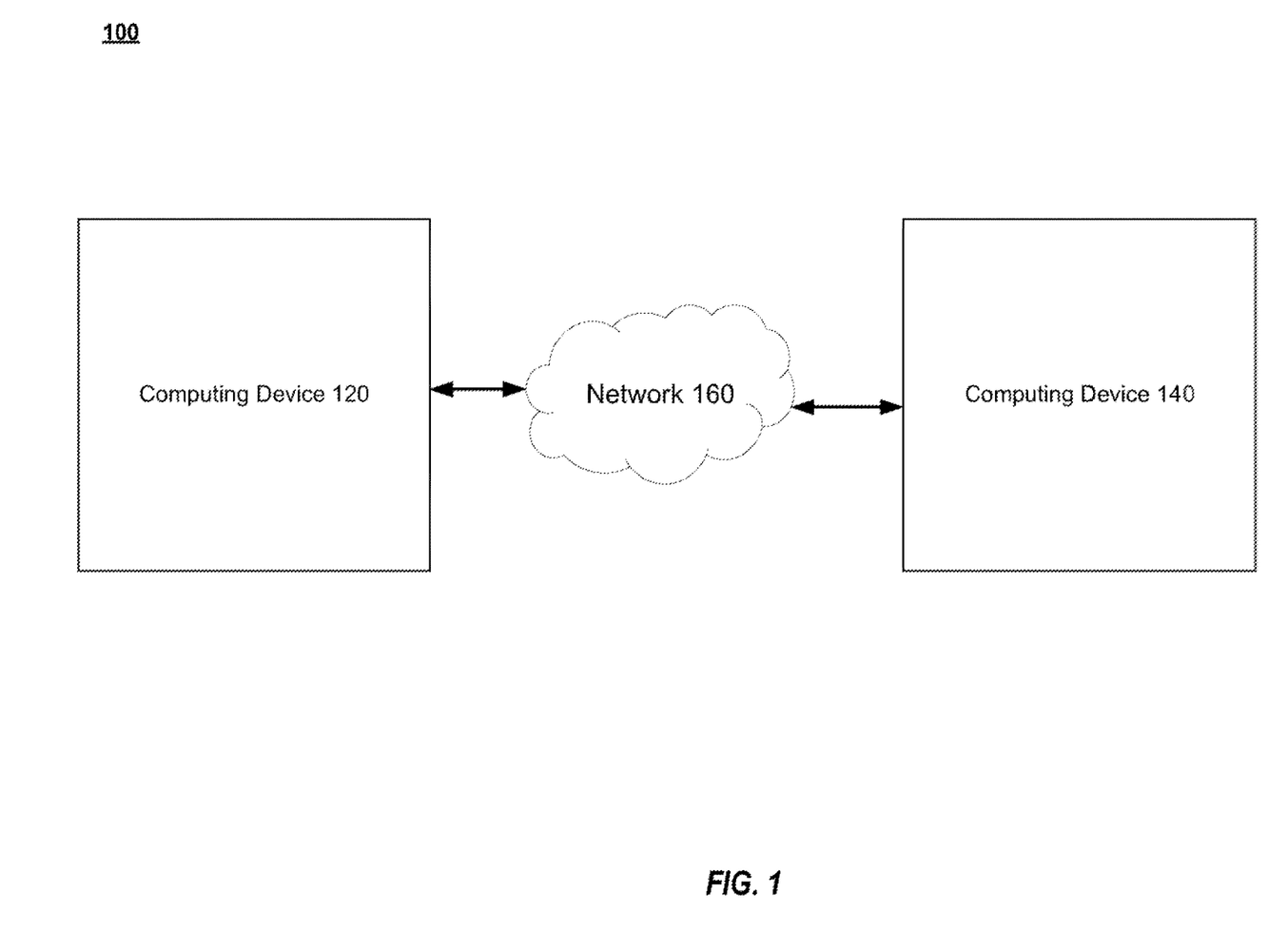
FIG. 1 illustrates an example environment in which first and second computing devices can exchange data over a network.

FIG. 1 illustrates an example environment 100 in which first and second computing devices can exchange data over a network. In the environment 100, computing device 120 and computing device 140 may communicate over network 160. In some cases, computing devices 120 and 140 may be implemented, for example, using some or all of the components of computing device architecture 900 shown in FIG. 9. However, this is merely an example and, in some cases, computing device 120 and/or computing device 140 may comprises respective FPGAs and/or ASICs. In some cases, computing device 120 and/or computing device 140 may include a plurality circuit blocks (e.g., a first through fifth circuit block) that may eb configured to implement aspects of the present disclosure. For example, computing device 140 may be semiconductor device including: a first circuit block configured to receive a first portion of data and a second portion of the data, the second portion of the data including error-detection code; a second circuit block configured to initialize data processing on the data after the first circuit block receives the first portion of data and before first circuit block receives the second portion of the data; a third circuit block configured to perform error detection on the data based on the error-detection code; a fourth circuit block configured to, in response to error detection performed by the third circuit block indicating that the data is valid, finalize data processing on the data and commit a data-processing result; and a fifth circuit block configured to, in response to the error detection performed by the third circuit block indicating that the data is invalid, performing an error-correction process.

Computing device 120 may transmit data to computing device 140 over network 160. The transmission may include one or more elements of error-correcting code. According to certain aspects of the present disclosure, computing device 140 may begin processing the data as soon as data reception begins. After the entire transmission is received, including the error-correcting code, computing device 140 may verify whether the data is valid. If found valid, computing device 140 may continue to utilize the data (e.g., commit the data processing result). If found invalid, computing device 140 may abandon the data processing, revert to a prior state, and/or perform additional error-correction procedures.

Figure 2:
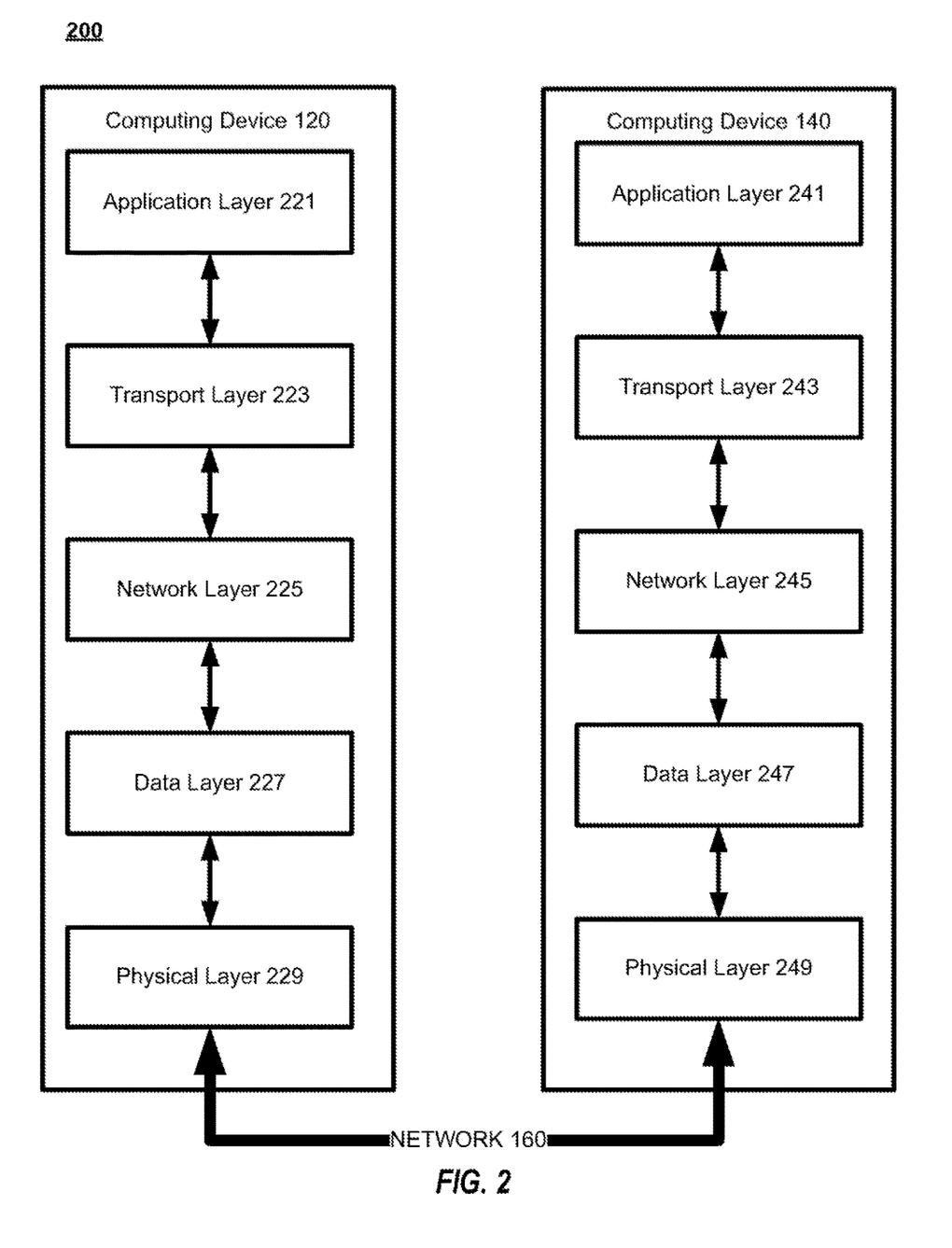
FIG. 2 depicts layered communication protocols through which first and second computing devices exchange data according to an example description.

FIG. 2 illustrates layered communication protocols through which first and second computing devices exchange data according to an example description. In FIG. 2, computing device 120 communicates with computing device 140 over network 160 using layered protocols. The layers may include application layers 221/241, transport layers 223/243, network layers 225/245, data layers 227/247, and physical layers 229/249.

Physical layers 229/249 may deal with bit-level transmission and reception between different devices. Physical layers 229/249 may include both wired and wireless transmission technologies (e.g., cables, connectors, interfaces). Data layers 227/247 may encode, decode, and/or logically organize data bits. In some cases, the data layer may include a media access control (MAC) layer and/or a logical link control that manages error checking and data flow over network 160.

Network layers 225/245 may receive data from the data layers 227/247 as packets. The network layers 225/245 may implement, for example, various internet protocol (IP) communication standards. In some cases, the network layer 225/245 may use error-detection code such as, for example, an IP check sum. Transport layers 223/243 provide logical communication between application executing on different systems (e.g., computing devices 120 and 140). Transport layers 223/243 may implement, for example, a Transmission Control Protocol (TCP). Transport layers 223/243 may implement additional error-detection codes.

Application layers 221/241 may communicate with each other through the layered communication stack. The application layers 221/241 may be implemented with application logic (e.g., hardware and/or software). The application logic may process data received from lower layers.

One of ordinary skill will recognize that these are merely examples and the layered communication protocol may include a subset of these layers, additional layers, and/or alternative layers. Moreover, one of ordinary skill will understand that these descriptions are non-exclusive and serve as examples only.

As a non-limiting example, physical layer 249 may receive bit-level transmissions from computing device 120 through network 160. Physical layer 249 may provide the bit-level data to data layer 247. Data layer 247 may, in some cases, perform error detection on the data bits, and pass the data to network layer 245. Network layer 245 also may perform error detection on the data organized as packets, and pass the data to transport layer 243. Transport layer 243 may reorganize the data, perform additional error detection on the data and pass the data to the application layer 241. Application layer 241 may then process the data. In related art systems and methods, each layer delays passing data to a higher level until any error detection confirms the data is valid. Thus, in the related art, application layer 241 must delay processing data until after all error-detection protocols for the stack are complete. Meanwhile, according to aspects of the present disclosure, one or more layers may transmit the data to high layers as the data is received. Thus, application layer 241 may begin processing data as it is received, increasing the speed of the data processing and reducing latency.

Figure 3:
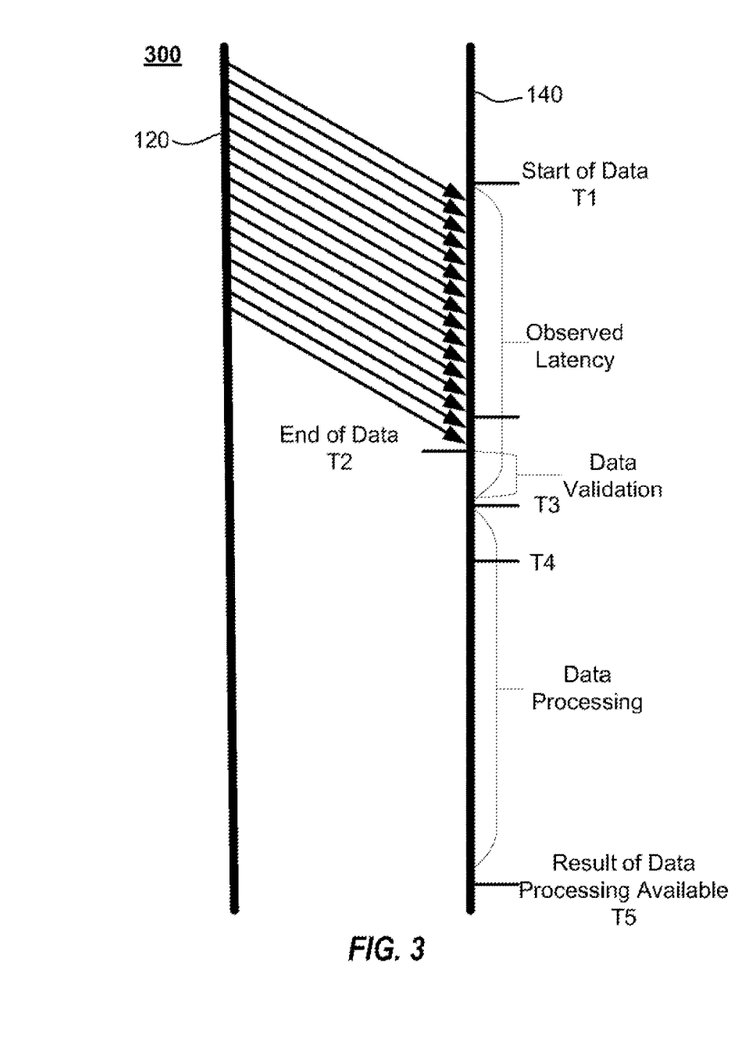
FIG. 3 is a timing diagram illustrating the latency incurred by delaying processing in the traditional flow.

FIG. 3 is a timing diagram 300 of a typical data transfer in the prior art where the data processing does not begin until after data validation. In FIG. 3, computing device 120 transmits data to computing device 140. At T1, computing device 140 begins receiving data from computing device 120. At T2, computing device 140 finishes receiving data from computing device 120 and begins data validation. At T3, data validation is complete, no error is detected, and data processing begins. At T5, data processing ends, and the result of the data processing is available. As is illustrated in FIG. 3, latency is observed between receiving the data T1 and starting data processing T3.

Figure 4:
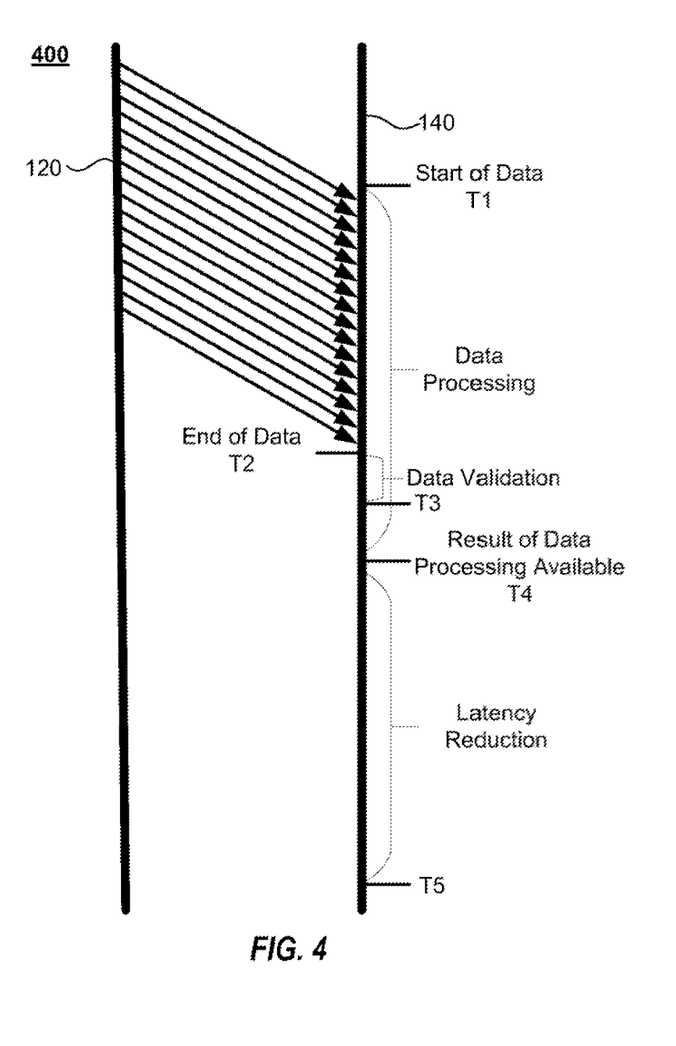
FIG. 4 is a timing diagram illustrating latency reduction associated with implementing processing according to an example embodiment of the present disclosure.

FIG. 4 is a timing diagram 400 illustrating the latency gains when implementing processing according to an example embodiment of the present disclosure. As with FIG. 3, in FIG. 4, computing device 120 transmits data to computing device 140. At T1, computing device 140 begins receiving data from computing device 120. Also, at T1 (or shortly thereafter), computing device begins processing data. At T2, computing device 140 finishes receiving data from computing device 120 and begins data validation. At T3, data validation is complete, no error is detected, and data processing proceeds. At T4, data processing ends and the result of the data processing is available. As is illustrated in FIG. 4, latency reduction over the traditional system and methods may be observed between the availability of the data processing result in FIG. 4 (T4) and the availability of the data processing result in FIG. 3 (T5). This time period may be equal to the observed latency in FIG. 3. One of ordinary skill will understand that this is merely an example. In some cases, data processing may complete prior to data validation. In such cases, the result of the data processing may be held back (e.g., not committed) until after the data is validated.

Figure 5:
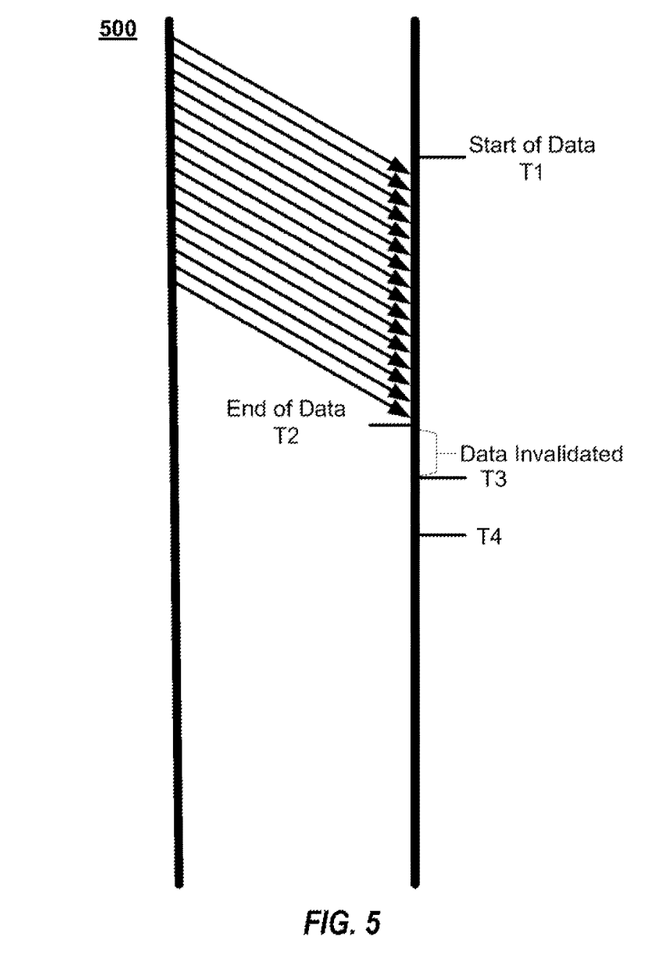
FIGS. 5 and 6 are timing diagrams illustrating data processing in a case where the data is invalidated.

FIG. 5 is a timing diagram 500 of a typical data transfer in the prior art where the data is found to be invalid. In FIG. 5, computing device 120 transmits data to computing device 140. At T1, computing device 140 begins receiving data from computing device 120. At T2, computing device 140 finishes receiving data from computing device 120 and begins data validation. At T3, data validation is complete, an error is detected, and the data is abandoned. In some cases, computing device 140 may request re-transfer of the data from computing device 120.

Figure 6:
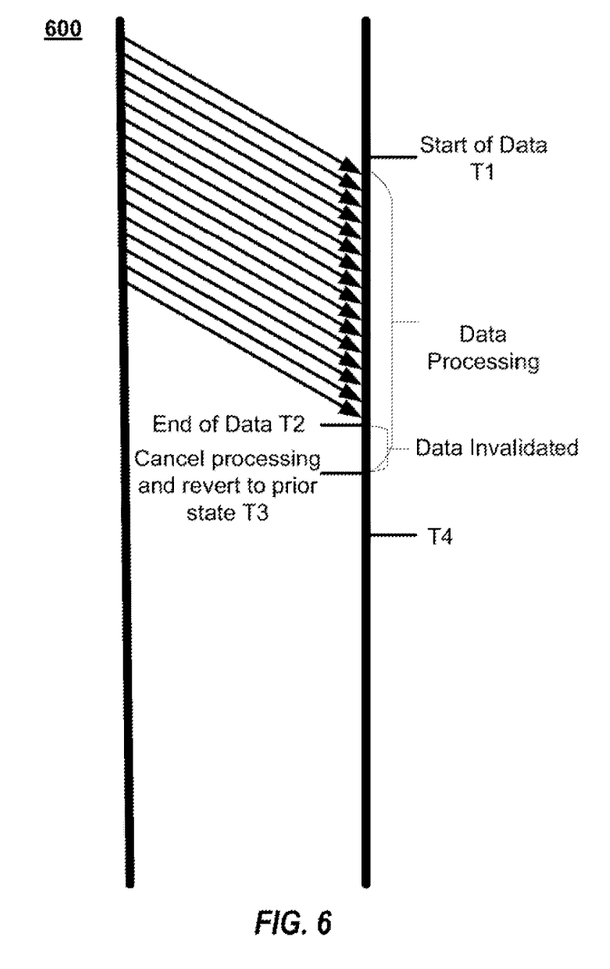

FIG. 6 is a timing diagram 600 illustrating the data transfer according to certain aspects of the present disclosure where the data is found to be invalid. As with FIG. 5, in FIG. 6, computing device 120 transmits data to computing device 140. At T1, computing device 140 begins receiving data from computing device 120. Also, at T1 (or shortly thereafter), computing device 140 begins processing data. At T2, computing device 140 finishes receiving data from computing device 120 and begins data validation. At T3, data validation is complete, an error is detected, and the processing is canceled (e.g., prior to finishing processing). Computing device 140 may request re-transfer of the data from computing device 120. In some cases, computing device 140 may merely wait for the re-transfer of data from computing device 120, for example, because computing device 120 may retransmit data in response to a failure to receive a positive acknowledgement within some period of time (e.g., TCP resends data packets after a timeout occurs without receiving an acknowledgement). In some cases, at T3, computing device 140 rolls back to a prior state, re-initializes an application state to some pre-determined safe value, and/or enters some other error recovery process. One of ordinary skill will understand that this is merely an example.

Figure 7:
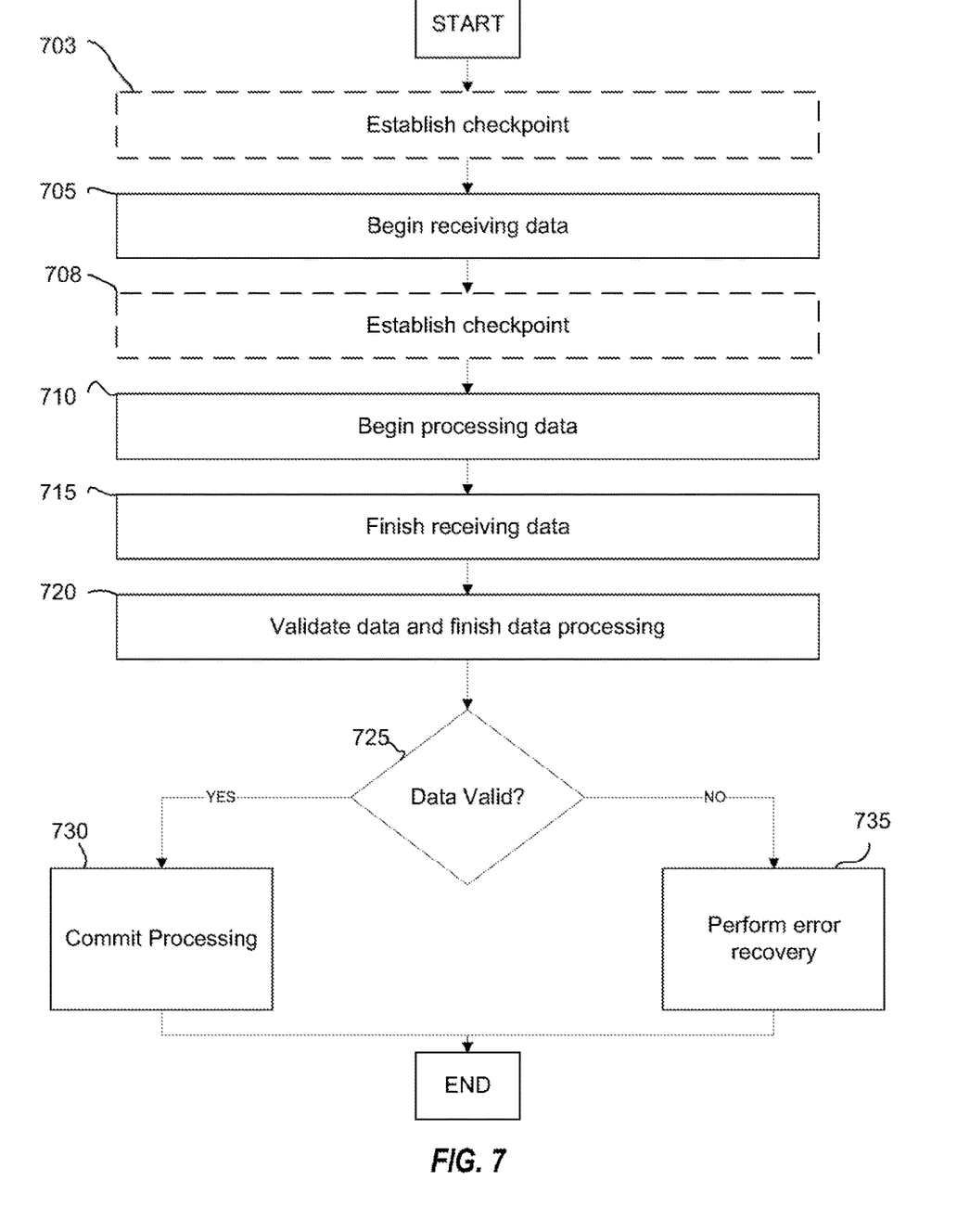
FIGS. 7 and 8 are flowcharts illustrating data processing flow according to an example embodiment.

FIG. 7 is a flowchart 700 illustrating data processing flow according to an example embodiment. The method may be performed by, as a non-limiting example, computing device 140. As shown in FIG. 7, computing device 140 begins receiving 705 data (e.g., from computing device 120) and begins processing 710 the data while it is being received. Computing device finishes receiving 715 data (e.g., a block of data corresponding a particular error-detection code), and then performs 720 data validation (e.g., error detection using the particular error-detection code) and finishes processing the data. If the data is valid (725—Yes), computing device 140 commits 730 the processing. If the data is found invalid (725—No), computing device 140 performs 735 error recovery. For example, computing device 140 may roll back to a prior state (i.e., a state before the data processing) and/or re-initializes its state to some pre-determined safe value.

In some implementations, computing device 140 also may establish (703 or 708) a checkpoint either prior to beginning data reception at 705 or prior to beginning data processing at 710. This checkpoint may be reverted (735) to if the data is found invalid (725—No).

In some cases, computing device 140 may perform the data processing in a designated memory (e.g., a designated register or logical section of memory for performing speculative processing). If the data is found valid (725—Yes), the data processing result may be persisted in a second memory for committing states after an error free reception and processing of data. Meanwhile, if the data is found invalid (725—No), computing device 140 may ignore the result in this designated register (e.g., eventually overwriting the data) and not persist the result in the second memory.

Figure 8:
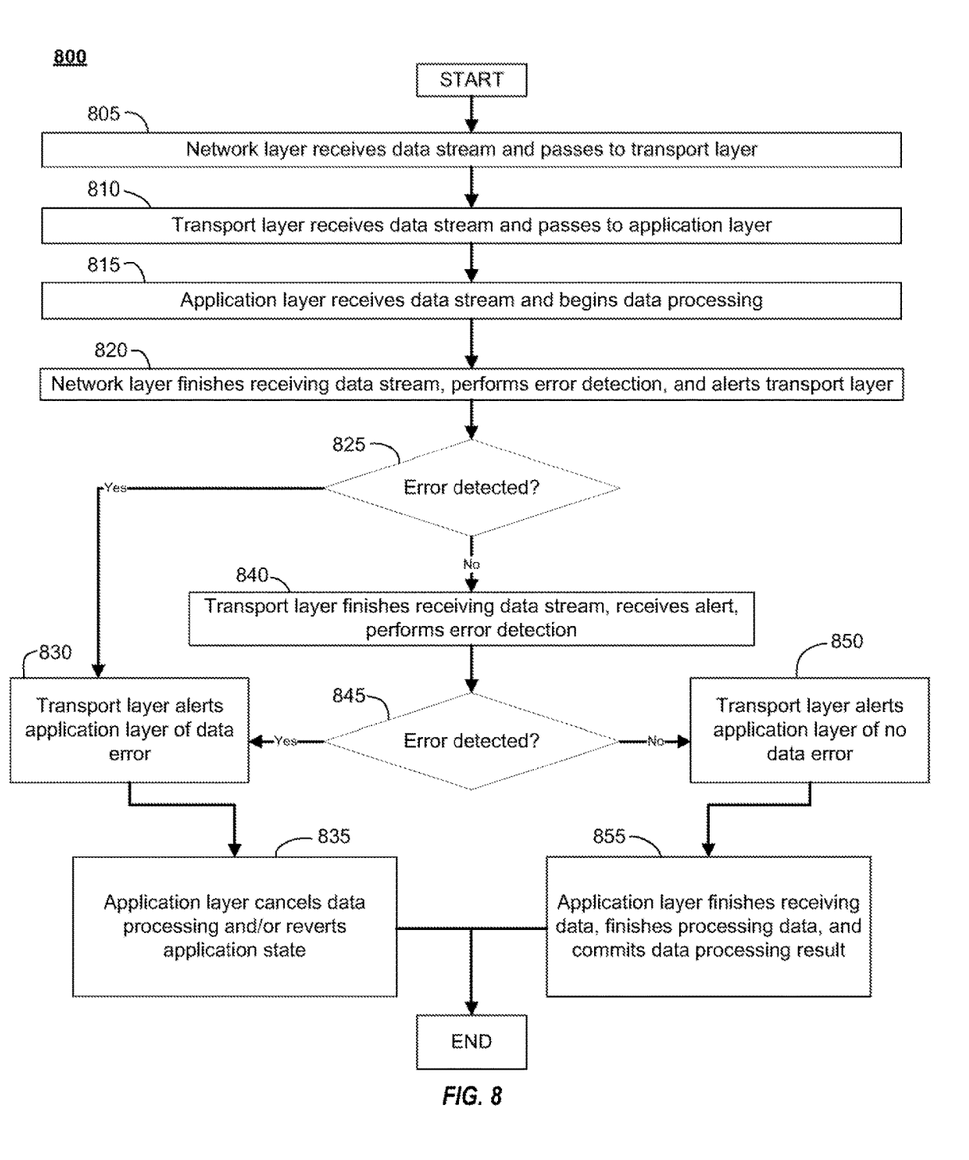

FIG. 8 is a flowchart 800 illustrating data processing flow according to an example embodiment. The method may be performed by, as a non-limiting example, computing device 140. Network layer 245 of computing device 140 begins receiving 805 data (e.g., from data layer 747 and ultimately from computing device 120) and passes the data to transport layer 243. Transport layer 243 begins receiving 810 the data from network layer 245 and begins passing the data to application layer 241. Application layer 241 begins receiving 815 the data from transport layer 243 and begins processing the data. Network layer 245 finishes receiving the data, performs 820 error detection, and alerts the transport layer a result of the error detection. If an error is detected (825—Yes), transport layer 243 alerts 830 application layer 241 of the error. Then application layer 241 receives 835 the alert, cancels the data processing and/or reverts the application state.

If the network later 245 does not detect an error (825—No), transport layer 243 receives the alert, finishes receiving the data, and performs its own error detection. If an error is detected (845—Yes), transport layer 243 alerts 830 the application layer 241 of the data error. If an error is not detected (945—No), transport layer 243 alerts 850 application layer 241 that no data error is detected. Finally, application layer 241 finishes receiving the data, finishes processing the data, and commits the data processing result at 855. One of ordinary skill will understand that this is merely an example and, in some cases, application layer 241 may finish processing the data prior to receiving an alert from transport layer 243. Additionally, in some implementations, transport layer 243 and/or network layer 245 may only transmit an alert if an error is detected. In such cases, application layer 241 may finish processing the data after all the data is received, and commit the processing result if no alert is received from the transport layer 243 within a predetermined period of time from finishing receiving the data. In certain embodiments, the predetermined period of time may be fixed (e.g., a fixed number of time or processing cycles after a last portion of the data is received) or may be variable based on, for example, one or more of an amount of data received and a processor utilization percentage.

Figure 9:
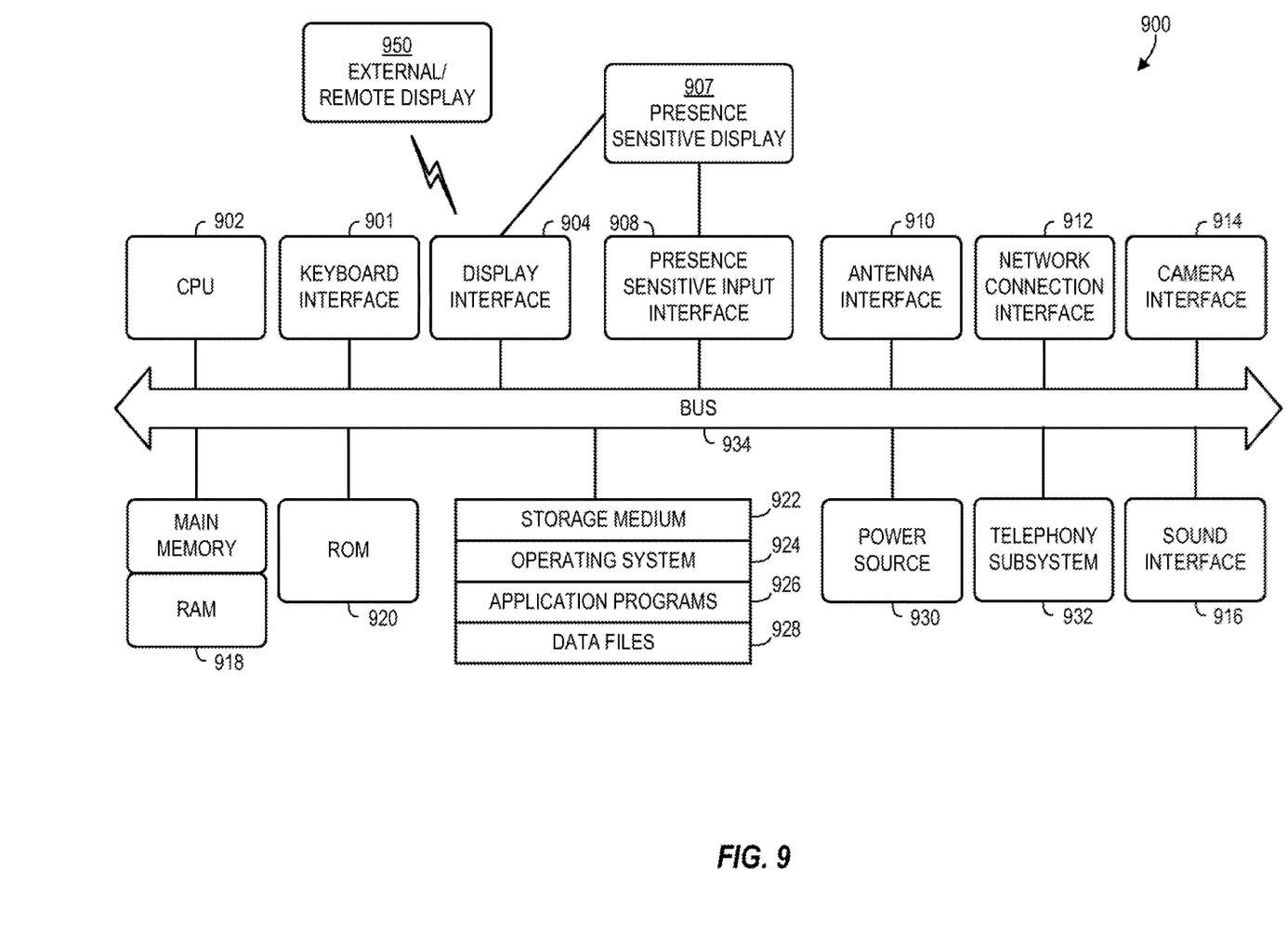
FIG. 9 is a block diagram of an illustrative computer system architecture 900, according to an example implementation.

Aspects of the disclosed technology may be implementing using at least some of the components illustrated in the computing device architecture 900 of FIG. 9. As shown, the computing device architecture includes a central processing unit (CPU) 902, where computer instructions are processed; a display interface 904 that acts as a communication interface and provides functions for rendering video, graphics, images, and texts on the display. In certain example implementations of the disclosed technology, the display interface 904 may be directly connected to a local display, such as a touch-screen display associated with a mobile computing device. In another example implementation, the display interface 904 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 904 may wirelessly communicate, for example, via a Wi-Fi channel or other available network connection interface 912 to the external/remote display.

In an example implementation, the network connection interface 912 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 904 may be operatively coupled to a local display, such as a touch-screen display associated with a mobile device. In another example, the display interface 904 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 904 may wirelessly communicate, for example, via the network connection interface 912 such as a Wi-Fi transceiver to the external/remote display.

The computing system architecture 900 (e.g., computer device or computing device architecture) may include a keyboard interface 906 that provides a communication interface to a keyboard. In one example implementation, the computing device architecture 900 may include a presence-sensitive display interface 908 for connecting to a presence-sensitive display 907. According to certain example implementations of the disclosed technology, the presence-sensitive display interface 908 may provide a communication interface to various devices such as a pointing device, a touch screen, a depth camera, etc. which may or may not be associated with a display.

The computing device architecture 900 may be configured to use an input device via one or more of input/output interfaces (for example, the keyboard interface 906, the display interface 904, the presence-sensitive display interface 908, network connection interface 912, camera interface 914, sound interface 916, etc.,) to allow a user to capture information into the computing device architecture 900. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 900 or may be a separate device. For example, the input device may be an accelerometer, a magnetometer, a digital camera, a microphone, and an optical sensor.

Example implementations of the computing device architecture 900 may include an antenna interface 910 that provides a communication interface to an antenna; a network connection interface 912 that provides a communication interface to a network. As mentioned above, the display interface 904 may be in communication with the network connection interface 912, for example, to provide information for display on a remote display that is not directly connected or attached to the system. In certain implementations, a camera interface 914 is provided that acts as a communication interface and provides functions for capturing digital images from a camera. In certain implementations, a sound interface 916 is provided as a communication interface for converting sound into electrical signals using a microphone and for converting electrical signals into sound using a speaker. According to example implementations, a random access memory (RAM) 918 is provided, where computer instructions and data may be stored in a volatile memory device for processing by the CPU 902.

According to an example implementation, the computing device architecture 900 includes a read-only memory (ROM) 920 where invariant low-level system code or data for basic system functions such as basic input and output (I/O), startup, or reception of keystrokes from a keyboard are stored in a non-volatile memory device. According to an example implementation, the computing device architecture 900 includes a storage medium 922 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 924, application programs 926 (including, for example, a web browser application, a widget or gadget engine, and or other applications, as necessary) and data files 928 are stored. According to an example implementation, the computing device architecture 900 includes a power source 930 that provides an appropriate alternating current (AC) or direct current (DC) to power components.

According to an example implementation, the computing device architecture 900 includes and a telephony subsystem 932 that allows the device 900 to transmit and receive sound over a telephone network. The constituent devices and the CPU 902 communicate with each other over a bus 934.

According to an example implementation, the CPU 902 has appropriate structure to be a computer processor. In one arrangement, the CPU 902 may include more than one processing unit. The RAM 918 interfaces with the computer bus 934 to provide quick RAM storage to the CPU 902 during the execution of software programs such as the operating system application programs, and device drivers. More specifically, the CPU 902 loads computer-executable process steps from the storage medium 922 or other media into a field of the RAM 918 in order to execute software programs. Data may be stored in the RAM 918, where the data may be accessed by the computer CPU 902 during execution. In one example configuration, the device architecture 900 includes at least 98 MB of RAM, and 256 MB of flash memory.

The storage medium 922 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 922, which may comprise a machine-readable storage medium.

According to one example implementation, the term computing device, as used herein, may be a CPU, or conceptualized as a CPU (for example, the CPU 902 of FIG. 9). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Certain embodiments of the disclosed technology are described above with reference to block and flow diagrams of systems and/or methods according to example embodiments of the disclosed technology. Some blocks of the block diagrams and flow diagrams may not necessarily need to be performed in the order presented, or may not necessarily need to be performed at all, according to some embodiments of the disclosed technology.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for reducing observed processing latency in a reception device, the reception device having a network layer, an application layer, and a layer lower than the application layer, the method comprising:
   receiving, by a reception device, a first portion of first data, the first data consisting of the first portion and a second portion;
   initializing, by the reception device, data processing on the first data after receiving the first portion of the first data and before receiving the second portion of the first data;
   receiving, by the reception device, the second portion of the data;
   in response to at least one error being detected in the first data or the processing of the first data, the network layer alerting the application layer of by the reception device to perform an error-correction process;
   receiving, by the reception device, a first portion of second data, the second data consisting of the first portion of the second data and a second portion of the second data;
   initializing, by the reception device, data processing on the second data after receiving the first portion of the second data and before receiving the second portion of the second data, the data processing being distinct from calculation of an error-detection code or an error-detection process of the second data; and in response to no error being detected in the second data or the processing of the second data, the network layer alerting the application layer to (i) finalize, by the reception device, the data processing on the second data, (ii) commit a data-processing result of the second data, and (iii) performing a transport layer error detection.

2. The method of claim 1, wherein performing the error-correction process comprises rolling back an application state to a prior state.

3. The method of claim 2 further comprising, before initializing the data processing, establishing an application checkpoint,
wherein performing the error-correction process comprises rolling back an application state to the application checkpoint.

4. The method of claim 3, wherein establishing the application checkpoint is in response to receiving the first portion of the first data.

5. The method of claim 2 further comprising disregarding the first data after rolling back the application state.

6. The method of claim 2 further comprising re-attempting processing the first data after rolling back the application state.

7. The method of claim 1, wherein performing the error-correction process comprises ceasing data processing on the first data.

8. The method of claim 7, wherein performing the error-correction process comprises ceasing data processing on the first data.

9. The method of claim 1, wherein performing the error-correction process comprises re-initializing the reception device to a safe state.

10. The method of claim 1, wherein the data processing on the first data is distinct from an error-detection process.

11. The method of claim 1 further comprising performing an error detection process.

12. The method of claim 11, wherein the error detection process is performed after receiving the second portion of the first data.

13. The method of claim 1, wherein the method is performed by at least one of a field-programmable gate array (FPGA) and an Application-Specific Integrated Circuit (ASIC) of the reception device.

14. A semiconductor device comprising:
a first circuit block configured to receive a first portion of first data and a first portion of second data;
a second circuit block configured to initialize data processing on the first data after the first circuit block receives the first portion of first data and before first circuit block receives the first portion of the second data;
a third circuit block configured to, in response to at least one error being detected in the first data or the processing of the first data, a network layer alerts an application layer to begin to perform an error-correction process;
a fourth circuit block configured to receive a first portion of second data, the second data consisting of the first portion of the second data and a second portion of the second data; and
a fifth circuit block configured to initialize data processing on the second data after receiving the first portion of the second data and before receiving the second portion of the second data, the data processing being distinct from calculation of an error-detection code or an error-detection process of the second data, in response to no error being detected in the second data or the processing of the second data, cause the network layer to alert the application layer to (i) finalize, by the fifth circuit block, the data processing on the second data, (ii) commit a data-processing result of the second data, and (iii) perform a transport layer error detection.

15. The semiconductor device of claim 14, wherein the third circuit block is configured to perform the error-correction process comprising rolling back an application state to a prior state.

16. The semiconductor device of claim 14, wherein
the second circuit block is further configured to, before initializing the data processing, establish an application checkpoint in response to receiving the first portion of data, and
the third circuit block is configured to perform the error-correction process comprising rolling back an application state to the application checkpoint.

17. The semiconductor device of claim 14, the third circuit block is configured to perform the error-correction process comprises re-initializing the semiconductor device to a safe state.

18. A system comprising:
a processor; and
a memory comprising instructions that, when executed by the processor, control the processor to implement a method for reducing observed processing latency in networked communication, the networked communication having a reception device having a network layer, an application layer, and a layer lower than the application layer, the method comprising:
receiving a first portion of first data, the first data consisting of the first portion and a second portion;
initializing data processing on the first data after receiving the first portion of the first data and before receiving the second portion of the first data;
receiving the second portion of the first data;
in response to at least one error being detected in the first data or the processing of the first data, the network layer alerting the application layer to perform an error-correction process;
receiving, by the reception device, a first portion of second data, the second data consisting of the first portion of the second data and a second portion of the second data;
initializing, by the reception device, data processing on the second data after receiving the first portion of the second data and before receiving the second portion of the second data, the data processing being distinct from calculation of an error-detection code or an error-detection process of the second data; and
in response to no error being detected in the second data or the processing of the second data, the network layer alerting the application layer to (i) finalize, by the reception device, the data processing on the second data, (ii) commit a data-processing result of the second data, and (iii) performing a transport layer error detection.

* * * * *